Patented Feb. 9, 1926.

1,572,417

UNITED STATES PATENT OFFICE.

WILLIAM PARNELL BATES, OF KEMPTON, NORTH DAKOTA.

DYESTUFFS AND PROCESS OF MAKING SAME.

No Drawing.  Application filed August 25, 1924. Serial No. 734,085.

*To all whom it may concern:*

Be it known that I, WILLIAM P. BATES, a citizen of the United States of America, and resident of Kempton, in the county of Grand Forks and State of North Dakota, have invented certain new and useful Improvements in Dyestuffs and Processes of Making Same, of which the following is a specification.

The present invention relates to a novel intermediate, and to a series of dyestuffs derivable from said intermediate. The invention also embraces a process of producing said intermediate; known to chemists as a chromogen.

In the preferred form of carrying out the process, aniline is diazotized at a temperature below 5° C., in known manner, the diazonium chloride thus formed is run into a hot mixture (or solution if soluble) of a diamine and water, or an amine and water. Care must be taken that the melted diamine, or amine, does not form a mass at the bottom of the container. The operation can be conducted at about 90° C. the temperature must not be allowed to fall much below this figure or the yield will be low, and phenol and other products formed. After all the diazonium chloride is added the stirring and heating is continued until no further action is noticed, (for one half to one hour).

The product formed melts and rises to the surface and can be separated by skimming.

Assuming that meta phenylene diamine is being used, the reaction may be expressed as follows:

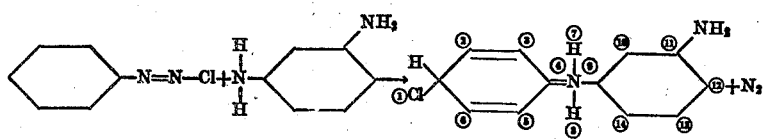

This compound is the chromogen corresponding to the particular diamine above mentioned. As stated before if the temperature is much below 90° C., the above body has been shown by experiment not to be formed, in any commercial quantities.

This product, as will be seen, is a quinone hydrochloride, united by

to an amino benzene. The above numbering of the positions is arbitrary, and for explanation.

The hydrogen and chlorine in position 1 are readily replaceable by various atoms or groups, say —COOH, —HSO₃ and many others, including both alkyl and aryl groups, forming dyes of various colors and shades.

The —NH₂ in the II position reacts with various organic and inorganic acids, to either confer solubility, or form dyes.

If positions I, and II are filled, the other hydrogens on the rings are replaceable.

The chromogen (intermediate) itself is a dyestuff; it dyes white feathers to produce an imitation of the Chinese wood duck feather but is improved by the addition of an OCH₃ group, as in Example 1.

This body (the chromogen from *m*-phenylene diamine) is a dark blue green crystalline mass, soluble in alcohol, almost entirely insoluble in water, ether, benzene, chloroform, etc. somewhat soluble in oils and fats. It dyes feathers, fur, hair, etc. brown.

A series of dyes may be produced by a more or less direct substitution of the chlorine in position 1, by aliphatic or aromatic radicals, the products will be useful dyestuffs giving various colors from bright orange to brown, depending on the radical substituted.

*Example 1.*—A simple example consists in the reaction of the chromogen with an equimolecular proportion of sodium methylate.

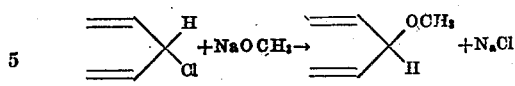

This product dyes white or light gray wild duck feathers to a peculiar brown, an almost perfect imitation of the Chinese wood duck.

This represents a very simple substitution for the chlorine, of an oxyalkyl radical. This product (the oxymethyl) seems to be the most satisfactory of this series of derivatives thus far produced.

Phenols and other R—OH bodies can be coupled in like manner.

*Example 2.*—By reacting on the base with an equimolecular proportion of sodium salicylate.

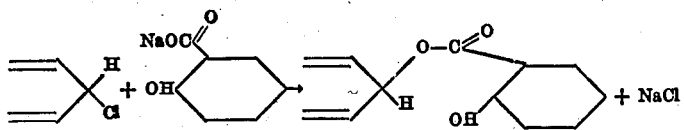

This on further treatment with fused zinc chloride, gives (by removal of one molecule of $H_2O$)

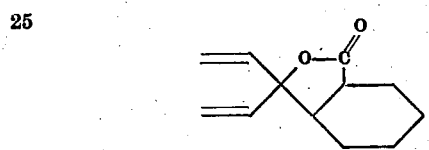

This dyes wool, even from a cold solution, to a bright orange.

*Example 3.*—By substituting para-hydroxy-phenyl-glycocoll in place of the chlorine, a colored body dyeing a rich yellow (with a slight orange cast) is formed.

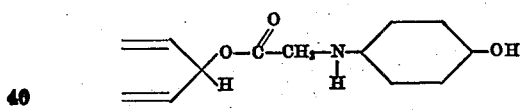

*Example 4.*—The substitution of —COOH in place of the chlorine. A thin paste is made of the base with alcohol and water. A slight excess over one molecular equivalent of KCN is added, and the mixture heated for several hours on a water bath, thus forming the nitrile;

This is further heated with somewhat dilute mineral acid, say 3 parts sulphuric to 2 parts of water, to hydrolyze the nitrile giving

This gives a deeper yellow than does Example 3.

A number of products are formed by direct sulfonation of the base, one believed to contain the grouping

was found to dye silk a rich golden brown (from acid bath), while what appears to be a simple sulfonic acid compound was found to dye silk a rich yellow (somewhat deeper than canary).

In cases where the chlorine is replaced by a radical (aromatic or aliphatic) and an $NH_2$ group is present on the second ring the derivative becomes soluble in an acid bath as is necessary in dyestuffs.

Where the position 1 and the free bonds of the $NH_2$ group are occupied by substituted or added radicals the other hydrogen atoms of the rings are replaceable.

I have referred particularly to the use of diamines to unite with the diazonium chloride. It is also possible to employ mono-amines in a similar manner. Thus with aniline there has been formed:

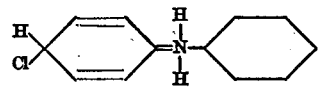

This body can be used in the above reactions, with the production of dyes of generally similar character to the above. If one wishes the $NH_2$ group present he would use the diamine, or one might use a monoamine with some other radical or group on the ring.

As stated above, the reaction to form the base, or chromogen, must be effected hot.

I claim:

1. A group of new bodies having the general formula

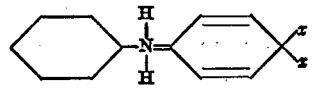

in which $x$ is a monovalent element or group.

2. A group of new bodies having the general formula

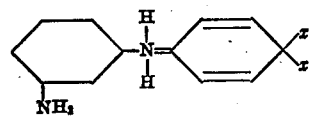

in which $x$ is a monovalent element or group.

3. A group of new bodies having the general formula

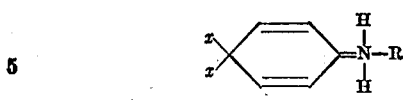

in which R is any aromatic radical and $x$ is a monovalent element or group.

4. A process which comprises adding a diazonium compound to an aromatic amine in the presence of water while maintaining the reaction mixture hot.

5. A process which comprises adding a diazonium compound to an aromatic diamine in the presence of water while maintaining the reaction mixture hot.

6. Dyes containing the nucleus defined in claim 1.

WILLIAM PARNELL BATES.